(12) United States Patent
Balkany

(10) Patent No.: US 8,396,844 B1
(45) Date of Patent: *Mar. 12, 2013

(54) HIERARCHICAL METHOD FOR STORING DATA WITH IMPROVED COMPRESSION

(76) Inventor: Alan Balkany, Ann Arbor, MI (US)

( * ) Notice: Subject to any disclaimer, the term of this patent is extended or adjusted under 35 U.S.C. 154(b) by 383 days.

This patent is subject to a terminal disclaimer.

(21) Appl. No.: 11/523,946

(22) Filed: Sep. 21, 2006

Related U.S. Application Data

(63) Continuation of application No. 09/541,631, filed on Apr. 3, 2000, now Pat. No. 7,139,765.

(51) Int. Cl.
*G06F 17/30* (2006.01)
(52) U.S. Cl. .................................. 707/693
(58) Field of Classification Search .......... 707/100, 707/101
See application file for complete search history.

(56) References Cited

U.S. PATENT DOCUMENTS

| 5,270,712 A * | 12/1993 | Iyer et al. .................. 341/50 |
| 5,592,667 A * | 1/1997 | Bugajski .................... 1/1 |

\* cited by examiner

*Primary Examiner* — Baoquoc N To

(57) ABSTRACT

A hierarchical data-compression method is described, with a compact form for sequences of consecutive tuples (and other techniques) to save space. A method for efficiently processing a subset of record fields is described. A flexible method for designing the data hierarchy (tree) is described.

25 Claims, 14 Drawing Sheets

Figure 2:
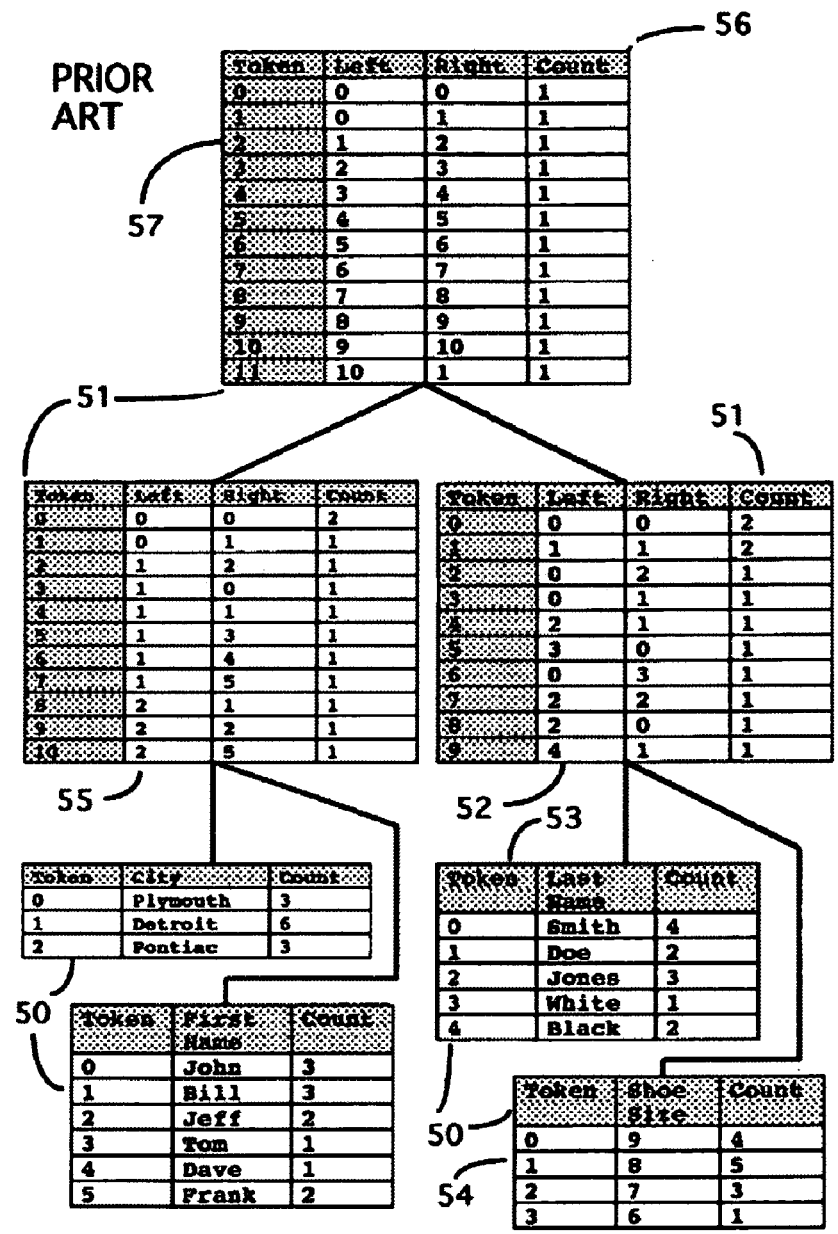

| Record | City | First Name | Last Name | Shoe Size |
|---|---|---|---|---|
| 1 | Plymouth | John | Smith | 9 |
| 2 | Plymouth | John | Doe | 8 |
| 3 | Plymouth | Bill | Smith | 7 |
| 4 | Detroit | Jeff | Smith | 8 |
| 5 | Detroit | John | Jones | 8 |
| 6 | Detroit | Bill | White | 9 |
| 7 | Detroit | Tom | Black | 9 |
| 8 | Detroit | Dave | Smith | 6 |
| 9 | Detroit | Frank | Jones | 7 |
| 10 | Pontiac | Bill | Jones | 9 |
| 11 | Pontiac | Jeff | Black | 8 |
| 12 | Pontiac | Frank | Doe | 8 |

Fig 1

(0, 1, 1, 6)   +   (4, 4) count 1

FIG. 8

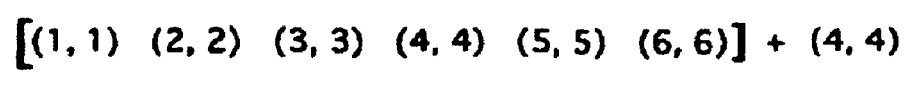

$$[(1, 1) \quad (2, 2) \quad (3, 3) \quad (4, 4) \quad (5, 5) \quad (6, 6)] + (4, 4)$$

Fig 10

(0, 1, 1, 6)   +   (4, 4) count 1

Fig 11

$\begin{bmatrix} (1,1) & (2,2) & (3,3) \\ (5,5) & (6,6) \end{bmatrix}$   +   (4, 4) count 2

HIERARCHICAL METHOD FOR STORING DATA WITH IMPROVED COMPRESSION

CROSS-REFERENCE TO RELATED APPLICATIONS

The present application is a continuation of U.S. patent application Ser. No. 09/541,631, for "Hierarchical Method for Storing Data with Improved Compression" filed Apr. 3, 2000, the disclosure of which is incorporated herein by reference.

The present application claims priority from U.S. patent application Ser. No. 09/541,631, for "Hierarchical Method for Storing Data with Improved Compression" filed Apr. 3, 2000, the disclosure of which is incorporated herein by reference.

BACKGROUND

1. Field of Invention

This invention relates to data storage, specifically to an improved data compression method.

2. Description of Prior Art

Data compression gives data processing systems several performance advantages over non-compressed systems:
1. It allows larger data sets to be contained entirely in main memory. This allows faster processing than systems that must access the disk.
2. It allows a task to be performed while processing fewer bytes. This further speeds processing.
3. It provides a more compact form for archival, transmission, or reading/writing between memory and disk.

Previous patents have described variants on a hierarchical compression scheme. It is necessary to first describe the approaches used in prior art. FIGS. 1 and 2 illustrate the data structures of a scheme that represents features common to the following U.S. Pat. Nos. 5,023,610 (1991); 5,245,337 (1993); 5,293,164 (1994); 5,592,667 (1994); 5,966,709 (1999); 5,983,232 (1999).

FIG. 1 shows a set of records to be compressed. Each record has four fields: City, First Name, Last Name, and Shoe Size. These fields can be considered to be four parallel data input sequences. Each sequence is an ordered set of values for one field over the record set.

FIG. 2 shows the tree structure used in prior art to represent this record set. At the bottom of FIG. 2, the "leaves" of the tree are dictionaries (50) that each correspond to one field in the record. A dictionary contains one entry for each unique value of the corresponding field. The entry is the unique value and a count of the number of times the value occurred in the stream of values from the field. For example, in the City dictionary, the value for one entry is "Detroit" and its count is 6.

When a value is encountered that was previously seen in the input sequence, it is not added to the dictionary. Instead, the count associated with that value in the dictionary is incremented.

A token is the (zero-based) order of a value in a dictionary. A token uniquely identifies a value in a dictionary. For example, the tokens 0 and 1 identify the values "John" and "Bill" respectively, in the First-Name dictionary in FIG. 2.

The nonleaf nodes ("interior nodes") (51) in FIG. 2 represent tuples of tokens from lower (leaf or interior) nodes. Here, for simplicity, the tuples are all pairs of tokens, each consisting of a left and a right member. (Higher-order tuples could also be used).

Each interior node here maintains a list of token pairs from its left and right child nodes. For example, the interior node above the Last Name and Shoe-Size leaves (52) contains pairs of tokens from these fields' dictionaries on the left and right. These token pairs are in the order their corresponding values were first seen in the Last-Name and Shoe-Size input sequences.

For example, the first left/right pair in (52) is (0, 0). This denotes token 0 from the Last-Name dictionary and token 0 from the Shoe-Size dictionary. This stands for the values "Smith" and "9" for the Last-Name and Shoe-Size fields in the first record.

Likewise, the second left/right pair in (52), (1, 1), stands for the value pair, ("Doe", "8"), in the second record. Each has a count of 1. If a token pair is the same as one recorded earlier, a new entry is not made. Instead, the count for that pair is incremented.

Each unique left/right token pair in an interior node is also assigned a token, representing the order that pair was first encountered from the left and right child nodes. For example, the tokens 0 and 1 in (55) correspond to the left/right token pairs, (0, 0) and (0, 1).

Likewise, the root node, (56), represents unique token pairs from nodes (52) and (55), in the order they were first encountered. The root node (56), represents every unique record in the tree. For example, to reconstruct the third record, we look at the third token (token 2) in the root node (56). This has left and right values of 1 and 2.

We look up token 1 in the root's left child (55) and get left and right values of 0 and 1. These are tokens for values in the City and First-Name dictionaries, respectively, which are "Plymouth" and "Bill", from the third record. A similar lookup with token 2 in interior node (52) gives "Smith" and "7" for the rest of the record.

Note that all the counts for token pairs at the root node are 1. Also note that there are consecutive runs where the left and right token numbers are each one more than the left and right token numbers in the previous entry. This can be seen for tokens 1 through 10 in the root node (56). For any give token in the range, we can get the left and right pair of the next token in this range by adding one to the left and right elements of the given token.

For example, in node (56), the left/right pair for token 5 (4, 5) has each element one more than the left/right pair for token 4 (3, 4).

Exhaustively representing all the token pairs in a sequence with such a regular pattern wastes a considerable amount of space.

Also if other trees are constructed to represent subsets of the data in the first tree, the dictionary values used must be duplicated in the leaves of these other trees. This redundancy also wastes a considerable amount of space. It also wastes the processing time it takes to duplicate the dictionaries.

U.S. Pat. No. 5,966,709 (1999) described a method of optimizing said tree structure. Said method used a variant of the Huffman Algorithm, which can produce sub-optimal tree designs when the value function is complex or nonmonotonic. Said method also calculates the exact size of a parent node by counting the tuples formed by the child nodes joined, which is computationally expensive.

U.S. Pat. Nos. 5,023,610 (1991), 5,245,337 (1993), and 5,293,164 (1994) described the compression of a single stream of data, while this invention describes the compression of multiple parallel sequences of data.

SUMMARY

In accordance with the present invention, an improved hierarchical data compression method uses:

a) a more compact method for representing tuple sequences, which saves memory and time,
b) data dictionaries shared among trees to avoid redundancy, which saves memory and time,
c) an efficient method of processing a subset of a tree's leaves, and
d) a flexible method of designing the tree.

OBJECTS AND ADVANTAGES

Accordingly, several objects and advantages of my invention are:
(a) to provide a more compact representation of data, by compressing an interior node's tuples, which saves space:
  (1) allowing larger data sets to be contained, in main memory,
  (2) speeds the transfer of said interior node between secondary storage and main memory,
  (3) speeds the transfer of said interior node over a communication channel,
  (4) speeding up processing by allowing a task to be performed while processing fewer bytes, and
  (5) allowing data sets to be archived more efficiently;
(b) to provide a more compact representation of data by separating a tree's leaves from their corresponding dictionaries, which:
  (1) saves space when processing multiple trees which share the same dictionaries, by avoiding redundant copies of dictionaries
  (2) speeds the transfer of multiple trees between secondary storage and main memory, by only having to move one copy of each dictionary,
  (3) speeds the transfer of multiple trees over a communication channel,
  (4) saves space, allowing multiple trees to be archived more efficiently;
  (5) speeds the creation of subsets of a tree, by avoiding rebuilding the dictionaries, and;
  (6) allows further compression by run-length encoding the leaves, which can be mainly an array of counts for values;
(c) to provide an efficient method for accessing a subset of a tree's leaves; and
(d) to provide a flexible method for designing a tree, which permits a variety of design strategies and preference heuristics.

DRAWING FIGURES

Figure 3:
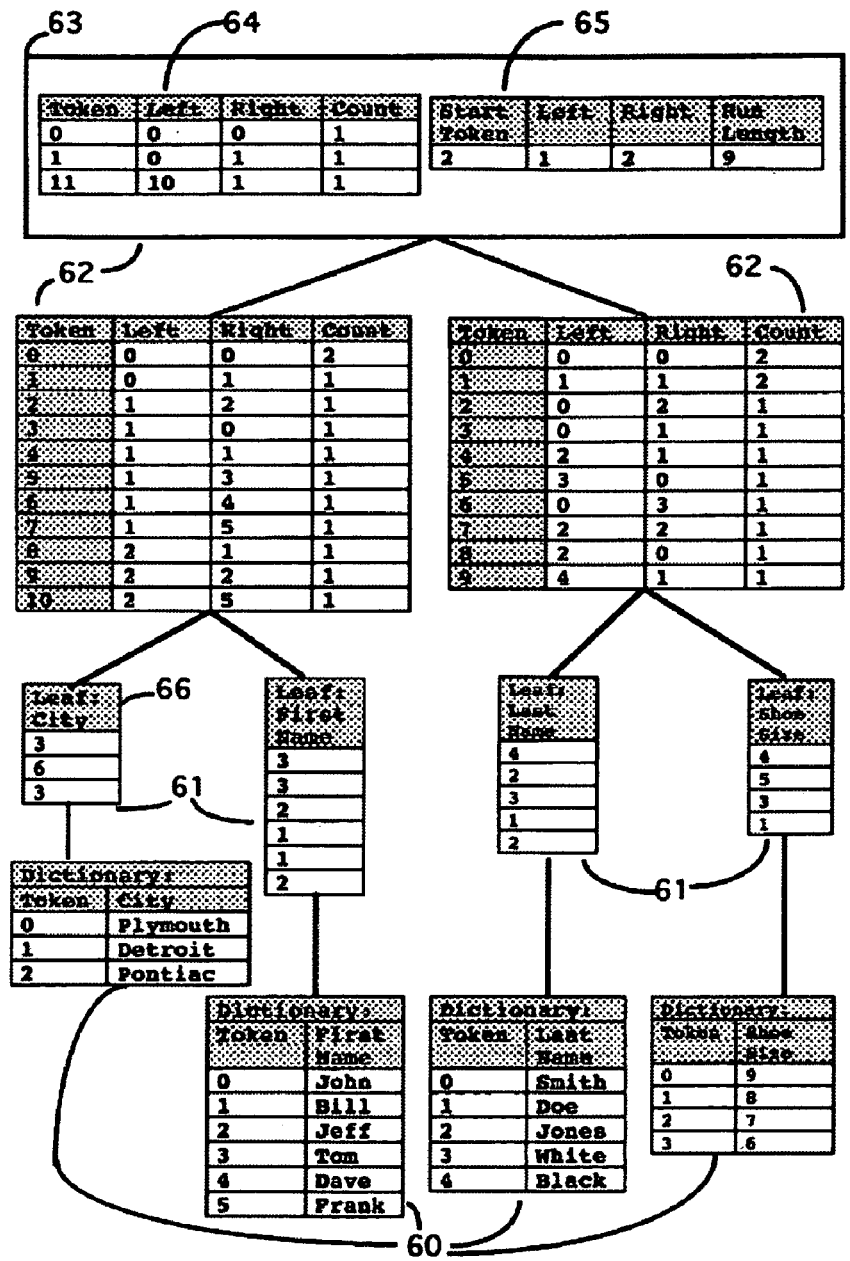
Figure 4:
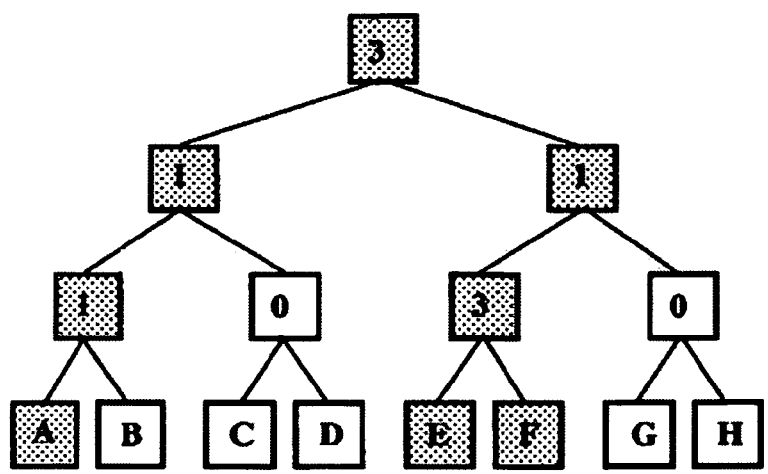
Figure 5:
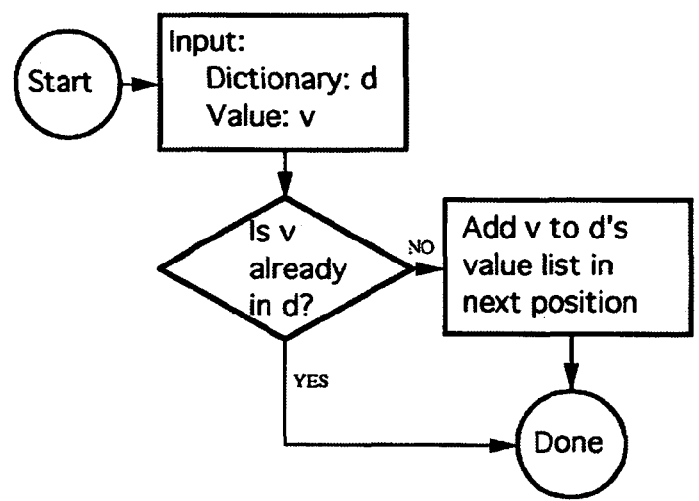
Figure 6:
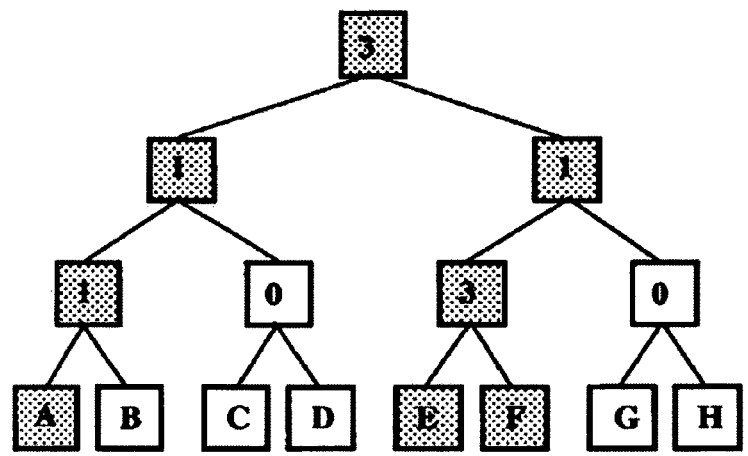
Figure 7:
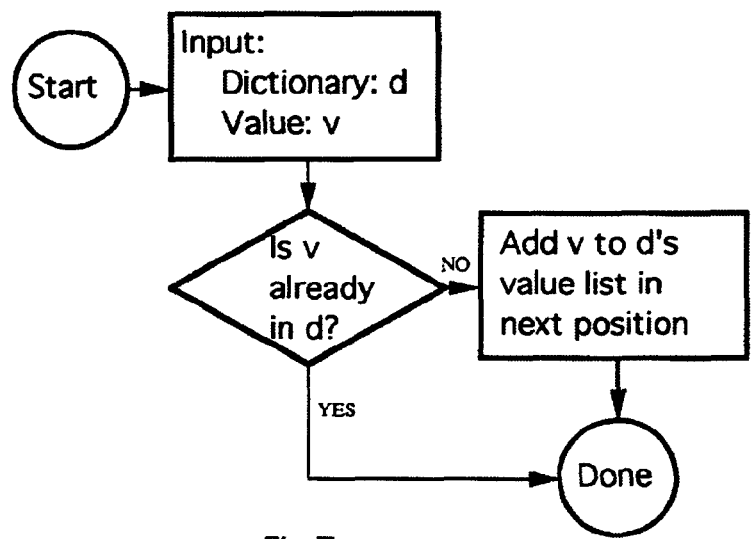
Figure 9:
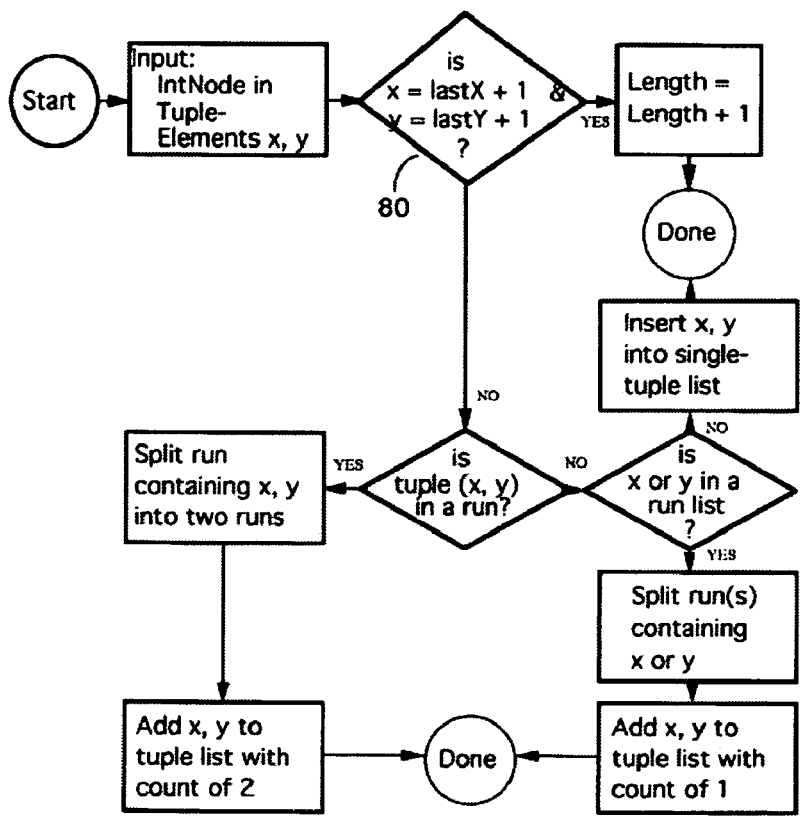
Figure 14:
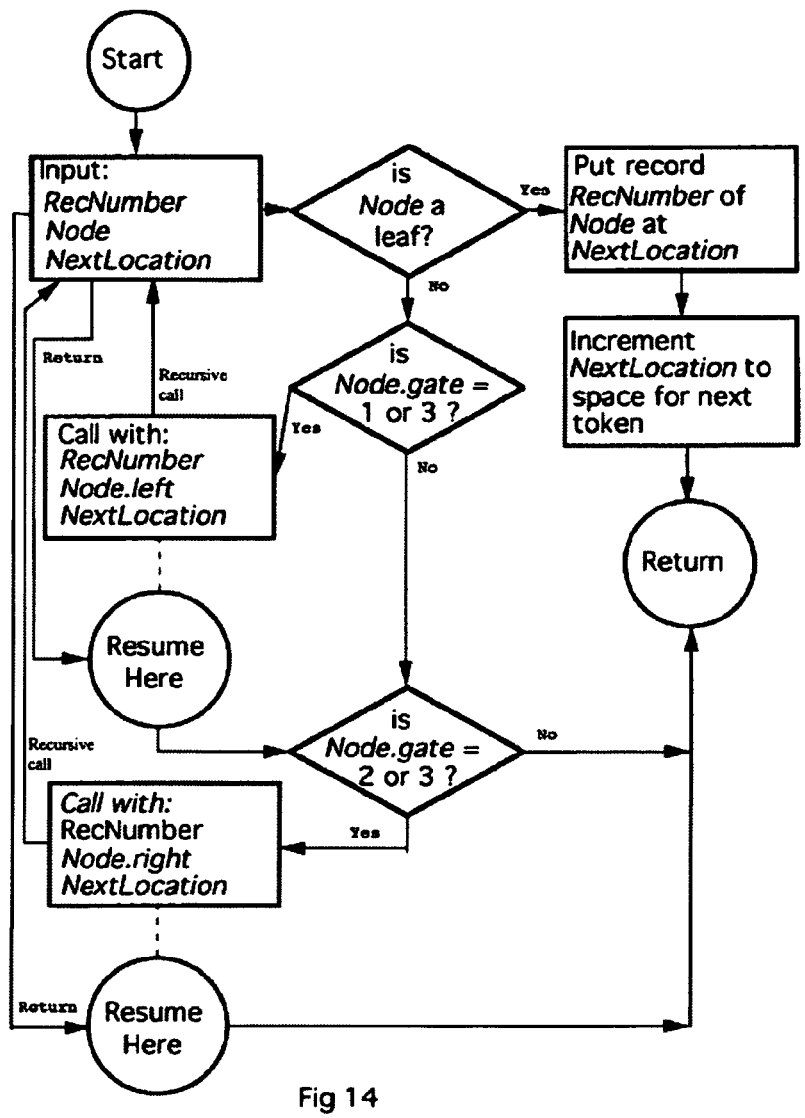

FIG. 1 is a set of records to be compressed
FIG. 2 is prior art compression schemes
FIG. 3 is a schematic of my storage method
FIG. 4 shows the nodes visited and avoided by gating
FIG. 5 shows the algorithm for adding a value to a dictionary
FIG. 6 shows the algorithm for adding a tuple to an interior node that stores tuple runs separately
FIG. 7 shows a single tuple being added to a set containing a tuple run
FIG. 8 shows the tuples of FIG. 7 represented with my method
FIG. 9 shows the state of the interior node after the tuple addition
FIG. 10 shows the tuples of FIG. 9 represented with my method
FIG. 11 shows an algorithm for retrieving a subset of a token record
FIG. 12 shows part of a problem space used in the design of a tree
FIG. 13 shows the general algorithm used to search a problem space.

REFERENCE NUMERALS IN DRAWINGS 50 leaf node, prior art
51 interior node, prior art
52 interior node over Last-Name and Shoe-Size leaves, prior art
53 the Last-Name dictionary, prior art
54 the Shoe-Size dictionary, prior art
55 interior node over City and First-Name leaves, prior art
56 the root node, prior art
57 token 2's entry in the root node, prior art
60 dictionaries, my method
61 leaves, my method
62 interior nodes, my method
63 the root node, my method
64 the single-tuple list in the root, my method
65 the tuple-run list in the root, my method
66 the City leaf node, my method
70 the initial state in the tree-design problem space
71, 72 two states in the problem space
80 the test whether a new pair extends the current tuple run

DESCRIPTION

Preferred Embodiment

1. Tree Structure

FIG. 3 shows an example of the storage method. The dictionaries (60) each associate the unique values of a field with a token number.

The tree leaves (61) are each associated with one dictionary, and represent a subset of that dictionary's values. In FIG. 3, each leaf contains an array of counts, where the nth count is the number of times the nth dictionary value occurs in the input data sequence for that leaf.

Definition: Run of unique, mutually-consecutive tuples.

A sequence of tuples such that the elements of each tuple are each one more than the elements of the previous tuple, e.g.:

{(10, 20) (11, 21) (12, 22) (13, 23)}

Is a run of mutually-consecutive tuples. If all of the left tokens in this run only appear once, in said run, and all of the right tokens in this run only appear once, in said run, this run is called a "run of unique mutually-consecutive tuples. We will refer to such a run as a tuple run for short.

Interior nodes (62) may store tuple runs separately from individual tuples. For example, this is done in the root node (63), which contains two lists: the first one a list of single tokens (64), and the second one, a list of tuple runs (65). (For comparison, the root node (56) in FIG. 2 represents exactly the same set of tuples as the root node (63) in FIG. 3).

The tuple list (64) contains the single tuples corresponding to tokens 0, 1, and 11. The tuple run list (65) contains one run of nine tuples. The run list, in this case, takes one ninth as much space as explicitly representing the nine tuples.

2. Separation of Dictionaries and Leaves

Each leaf represents a subset of values from its corresponding dictionary. This can be done, for example, with an array of counts, such that the nth count is the number of times the nth dictionary value occurs in the leaves input data sequence.

For example, the City leaf (66) in FIG. 3 contains the counts, "3, 6, 3". These stand for the number of times the cities, Plymouth, Detroit, and Pontiac, respectively, occurred in the City input data sequence.

A leaf's count array may contain many consecutive repetitions of the same count, and may be further compressed using run-length encoding.

3. Interior Node Gating

Each interior node has an integer, gate, associated with it. When access to only a subset of a tree's fields is needed for a record, we can speed up the process using the interior nodes' gates.

We store a value in each gate that tells if either of the interior node's subtrees contains a field in the subset we're interested in. This allows us to skip searching down subtrees that don't have any fields in the subset of fields we're looking for.

For example, see FIG. 4. The shaded nodes are the ones we'd have to visit to retrieve values from nodes A, E, and F for a record. The number in each interior node in FIG. 4 is the gate value to visit only leaf nodes A, E, and F.

A gate value of 0 means neither subtree contains a field in the subset. A value of 1 or 3 means the left subtree contains a field in the subset. A value of 2 or 3 means the right subtree contains a field in the subset.

Gating here visits 8 of 15 nodes, approximately halving the number of node visits required.

4. Tree Construction Process

A tree is constructed for a set of fields which have corresponding dictionaries. The design process is modeled as a search of a problem space with operators and a value function.

A problem space is:
(a) a set of states such that, each state represents a partial tree design; the leaves and zero or more interior nodes, each interior node the parent of two or more other nodes,
(b) one or more operators that transform one state to another, and
(c) a value function, giving a numeric ranking of the value of any state's design, The design process starts from an initial state in the problem space, and applies operators to move to other states, until an acceptable design is reached.

Typical operators are: (a) joining multiple nodes under a new interior node, (b) a delete operation: deleting an interior node and separating its child nodes, (c) swapping two nodes.

Typical value functions may include the sizes of the interior nodes, preferences for certain fields to be near each other, and preferences that certain fields permit fast access.

For example, FIG. 12 shows part of a problem space. The initial state (70) of the problem space contains three leaves: A, B, and C. The three states the initial state can reach in FIG. 12 are each reached by applying the "Join" operator. This operator joins two nodes in a state, under a new interior node. In each of said three states, two of the leaves that were unjoined in the initial state are now joined.

We can transition from state (71) to state (72) in FIG. 12, using the "Swap" operator. This operator exchanges the positions of two nodes, here, B and C.

Applying the swap operator a second time undoes the swap operation, in effect, backtracking to the previous state in the problem space. The "Delete" operator deletes an interior node, which is the inverse of the join operator, so can backtrack from a join. Backtracking allows the problem space to be searched for an acceptable design.

DESCRIPTION

Alternative Embodiments (a) Tuple run storage in interior nodes can be selectively enabled, storing only single tuples in the nodes where it has been disabled. This avoids the overhead of two lists for lower interior nodes, where tuple runs are less frequent.
(b) Leaves can contain an array of Booleans, where the nth Boolean is TRUE if the nth dictionary value is present in a tree. This can be stored as a bit array, which is more compact than storing the counts, and can be further compressed by run-length encoding the bits.
(c) When designing a tree, the size of an interior node can be quickly approximated as a predetermined fraction of the product of said interior node's childrens' sizes. Although not optimal, this is much faster that the laborious calculation of the parent's exact size required by an optimal algorithm. A value of ⅓ for said fraction produces reasonable results.

Operation

There are four basic operations on my invention:
1. Dictionary construction
2. Tree construction
3. Token record insertion
4. Access to a subset of a record 1. Dictionary Construction FIG. 3 (60) is an example of four dictionaries, each of which associates a unique token number with each unique value that occurs in one field. FIG. 5 shows the algorithm for adding a value to a dictionary. If the value is not already in the dictionary, it is added to the dictionary, and associated with the next unused token number.

2. Tree Construction

Figure 15:
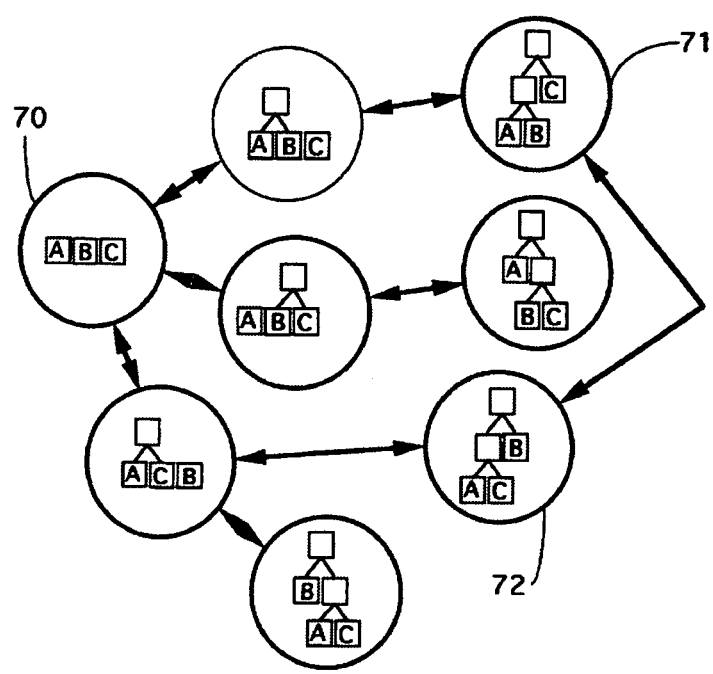
Figure 16:
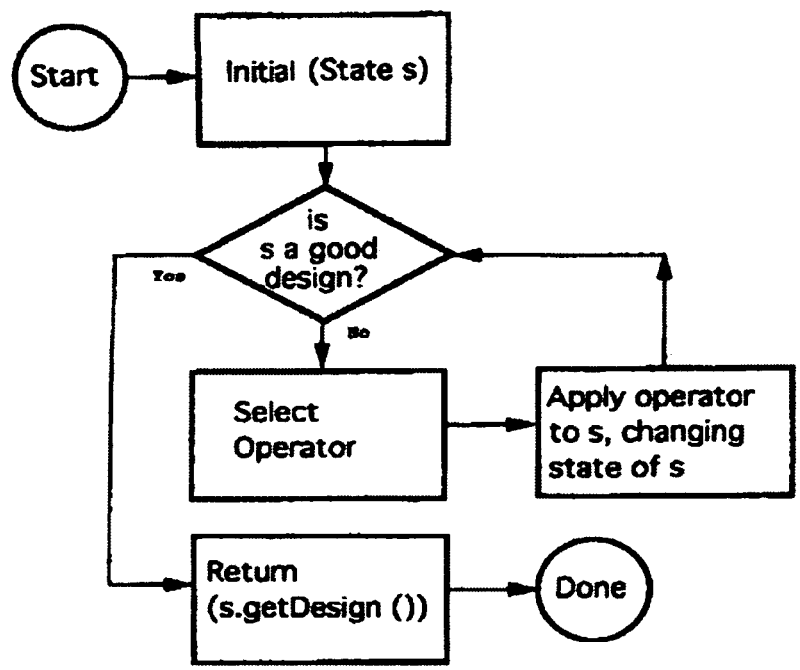

Tree construction is modeled as a search through a problem space. See FIG. 15 for part of a problem space. FIG. 16 shows the general algorithm used. Operators are iteratively selected and applied to the current design state to obtain the next design state.

The process terminates when the current state represents an acceptable design. By varying the available operators and/or how they are selected, different problem-space search behaviors can be produced 3. Record Addition When a record is added to a tree, each field value is first processed by a dictionary, mapping it to a token number. Thus the record is transformed into an equivalent record composed of tokens representing the original field values.

Each interior node has two children which may be either leaves or interior nodes. Each pair of tokens from sibling nodes is sent to their parent interior node. The parent node checks if this pair (tuple) of values is already stored. If not, the tuple of values is associated with the next unused token number, and stored in the parent node with a count of 1. If it is already stored, its count is incremented.

The interior node then, in turn, sends the token number associated with this pair to its parent. Thus, at each interior level, pairs (tuples) of tokens are recorded and mapped to single tokens. These pairs can later be looked up by their associated token number.

Interior Node Storage

An interior node has a list of the left/right token pairs it has been sent from its left and right children. The interior node may optionally keep a list of pair (tuple) runs that have occurred. FIG. 6 is a flow chart that shows how a pair is added to an interior node that stores tuple runs separately.

When a tuple is added to an interior node, there are four possible results:

(a) It can extend a tuple run.

This corresponds to the first decision diamond (80) in FIG. 6: "is x=lastx+1 & y=lasty++1 ?". If true, it means the pair, x, y, extends a tuple run. Thus just incrementing the length field of the current tuple run records the addition of this pair to this interior node.

(b) It can invalidate one or more existing runs by duplicating any of their tokens.

This situation is illustrated in FIGS. 7-10. FIG. 7 diagrams a tuple, (4, 4) being added to a tuple run with six elements. The tuple run would actually be represented as in FIG. 8, with the following fields: (start token, start left value, start right value, run length). So (0, 1, 1, 6) stands for the run starting with token 0, and left and right values starting at (1, 1), and length 6.

All left and all right values in a tuple run are assumed to occur only in that run. The tuple being added in FIG. 8, (4, 4), duplicates a tuple in the run, thus invalidating that run. The run is then split into subruns that do not contain the tuples with duplicated values.

FIG. 9 diagrams the state of the interior node from FIG. 7 after the tuple (4, 4) has been added. The two resulting subruns omit (4, 4), which has been inserted into the single-tuple list.

The form used inside the interior node is shown in FIG. 10. The two entries on the left in FIG. 10 represent the two runs in the node's tuple run list. The first run starts with token 0 and has a length of 3, and the second run starts with the token 4 and has a length of 2. The entry on the right denotes token 3 is associated with left & right values of (4, 4), and has a count of 2.

(c) It may not do either 1 or 2, and is in the single-tuple list.

In this case we increment the count associated with the tuple in the single-tuple list.

(d) It may not do either 1 or 2, and the pair is not in the single-tuple list.

In this case, we add the tuple to the single-tuple list with a count of one.

4. Access of Subset of a Record

To efficiently access a subset of a record, the gate fields of the interior nodes are set as previously described. We look at an example of accessing a record subset. The algorithm of FIG. 11 is applied to a tree root to retrieve a token record for a given record number, and a subset of the fields.

See FIG. 11. The input to the algorithm is:

(a) the token number of the record to be retrieved,
(b) a node to search from
(c) the location to store the next token retrieved The token number originally supplied to the algorithm is the record number. The node to search for is initially the root node over the subset of fields to be retrieved.

We look up left and right values from the given token number. If said node has a gate value of 1 or 3, we recursively search the node's left subtree, with said left value. If said node has a gate value of 2 or 3, we recursively search the node's right subtree, with said right value.

When a leaf is reached, we store the given token number at the next location in the token record we're constructing. We also increment the token-record location to point to the next space.

CONCLUSION, RAMIFICATIONS, AND SCOPE

Thus the reader will see that my invention provides a more compact method of storing data records. This provides several benefits, including fitting larger data sets into main memory, allowing the data sets to be processed faster, improving the speed of loading/storing data between main memory and disk, and providing more efficient transmission and archival of said data sets.

An efficient algorithm for retrieving a record subset from this storage method is presented. A flexible algorithm for tree design is also presented.

While my above description contains many specificities, these should not be construed as limitations on the scope of the invention, but rather as an exemplification of one preferred embodiment thereof.

Accordingly, the scope of the invention should be determined not by the embodiment(s) illustrated, but by the appended claims and their legal equivalents.

SEQUENCE LISTING

Not applicable

I claim:

1. A method for storing a plurality of parallel data element sequences on a computer memory component and efficiently processing elements on a computer processor from a subset of said sequences, comprising:

(a) creating a plurality of dictionaries, on the computer memory component, each of unique values for one of said data element sequences, wherein said dictionaries associate numeric indexes with unique values, (b) forming one or more n-ary trees, on the computer memory component, with leaf and interior nodes wherein:

(1) a plurality of leaf nodes on the computer memory component each correspond to one of said dictionaries, (2) at least one interior node on the computer memory component associates a numeric index with tuples of numeric indexes from other subordinate leaf or interior nodes, (3) at least one of said interior nodes on the computer memory component has a gate field associated with it, which is capable of representing a subset of said interior node's subtrees, (c) processing the subset of leaf nodes corresponding to said subset of sequences, on the computer processor, by:

(1) finding one of said interior node(s) on the computer memory component that is a common ancestor in said n-ary tree of each said leaf node in said leaf subset, (2) setting the value of said gate field on the computer memory component for at least one of said interior nodes, to indicate which of said interior node's branches to subordinate nodes lead to leaf nodes in said subset, (3) following a path on the computer memory component from said common-ancestor interior node to at least one of said leaf nodes in said leaf subset, using at least one interior node's gate field setting to select a path that leads to a leaf node in said leaf subset, and (4) processing said element(s) in said leaf node(s) on the computer processor.

2. A method for improving compression for storing a plurality of parallel data element sequences on a computer memory component and retrieval of at least one element on a computer processor comprising:

(a) creating a plurality of dictionaries, on the computer memory component, each of unique values for one of said data element sequences, wherein said dictionaries associate numeric indexes with unique values, (b) forming one or more n-ary trees with leaf and interior nodes on the computer memory component wherein:
  (1) at least one of said leaf nodes on the computer memory component:
    a. is distinct from, and represents a subset of values from one of said dictionaries, and
    b. shares its dictionary with at least one other leaf node which also represents its subset of said dictionary's values, and
  (2) at least one interior node on the computer memory component associates a numeric index with tuples of numeric indexes from other subordinate leaf or interior nodes, and
  (3) said distinct leaf node(s) on the computer memory component is(are) capable of retrieving the value associated with a numeric index by obtaining said value from said leaf node's associated dictionary, and
(c) retrieving on the computer processor at least one element from one of said distinct leaf node(s) on the computer memory component.

3. A method for constructing a hierarchical data-storage structure to improve compression for storing a plurality of parallel data element sequences on a computer memory component and retrieval of at least one element on a computer processor comprising:
(a) creating a plurality of dictionaries, on the computer memory component, each of unique values for one of said data element sequences, wherein said dictionaries associate numeric indexes with unique values,
(b) forming one or more n-ary trees on the computer memory component with leaf and interior nodes wherein:
  (1) a plurality of leaf nodes on the computer memory component each correspond to one of said dictionaries,
  (2) at least one interior node on the computer memory component associates a numeric index with tuples of numeric indexes from other subordinate leaf or interior nodes, wherein the forming step includes:
    i. defining a problem space comprising:
      (1) a set of states, wherein each said state contains an n-ary tree design, said design comprising a set of leaves and zero or more interior nodes, wherein each said interior node has zero or more other nodes as children, and
      (2) a value function, giving a numeric ranking of the value of any state's n-ary tree design, wherein said numeric ranking is used to perform at least one of:
        a. determine if said state's n-ary tree design is acceptable, or
        b. rank the n-ary tree designs of states reachable by applying operators to a state, to select an operator,
    ii. defining one or more operators that transform one state to another, and
    iii. searching said problem space, starting from an initial state and applying operators to move to other states until a state with an acceptable n-ary tree design is reached, wherein said method for forming said n-ary tree uses an estimate of interior node size, from a function of the sizes or estimated sizes of said interior node's child nodes, and
(c) retrieving on the computer processor at least one element from one of said trees' leaf nodes on the computer memory component.

4. The method of claim 1, wherein said processing includes using values or tokens at said leaf nodes to reconstruct a subset of a stored record.

5. The method of claim 4, further including the step of adding one or more of said reconstructed record subsets to another tree.

6. The method of claim 3 wherein at least one of said operators combines a plurality of nodes under an interior node.

7. The method of claim 1, wherein at least one of said leaf nodes is distinct from, and represents a subset of values from one of said dictionaries.

8. The method of claim 1, wherein at least one of said dictionaries is shared by a plurality of said n-ary trees.

9. The method of claim 1, wherein one or more of said interior nodes are capable of storing one or more sequences of mutually-consecutive tuples by either
  (a) representing at least one of said one or more sequences in a form that uses less storage space than representing said sequence as individual tuples, or
  (b) representing at least one of said one or more sequences by explicitly or implicitly using the length of said sequence.

10. The method of claim 2, wherein at least one of said dictionaries is shared by a plurality of said n-ary trees.

11. The method of claim 2, wherein one or more of said interior nodes are capable of storing one or more sequences of mutually-consecutive tuples by either:
  (a) representing at least one of said one or more sequences in a form that uses less storage space than representing said sequence as individual tuples, or
  (b) representing at least one of said one or more sequences by explicitly or implicitly using the length of said sequence.

12. The method of claim 7, wherein at least one of said dictionaries is shared by a plurality of said n-ary trees.

13. The method of claim 9, wherein at least one of said leaf nodes is distinct from, and represents a subset of values from one of said dictionaries.

14. The method of claim 11, wherein at least one of said dictionaries is shared by a plurality of said n-ary trees.

15. The method of claim 9, wherein at least one of said dictionaries is shared by a plurality of said n-ary trees.

16. The method of claim 13, wherein at least one of said dictionaries is shared by a plurality of said n-ary trees.

17. The method of claim 12, wherein the forming step defines a problem space comprising:
(a) a set of states, wherein each said state contains an n-ary tree design, said design comprising a set of leaves and zero or more interior nodes, wherein each said interior node has zero or more other nodes as children, and
(b) a value function, giving a numeric ranking of the value of any state n-ary tree design, wherein said numeric ranking is used to perform at least one of:
  (1) determine if said state's n-ary tree design is acceptable, or
  (2) rank the n-ary tree designs of states reachable by applying operators to a state, to select an operator,
  defining one or more operators that transform one state to another, and
  searching said problem space, starting from an initial state and applying operators to move to other states until a state with an acceptable n-ary tree design is reached.

18. The method of claim 16, wherein the forming step defines a problem space comprising:

(a) a set of states, wherein each said state contains an n-ary tree design, said design comprising a set of leaves and zero or more interior nodes, wherein each said interior node has zero or more other nodes as children, and (b) a value function, giving a numeric ranking of the value of any state n-ary tree design, wherein said numeric ranking is used to perform at least one of:

(1) determine if said state's n-ary tree design is acceptable, or
  (2) rank the n-ary tree designs of states reachable by applying operators to a state, to select an operator, defining one or more operators that transform one state to another, and searching said problem space, starting from an initial state and applying operators to move to other states until a state with an acceptable n-ary tree design is reached.

19. The method of claim 1, wherein at least one, unique value of a leaf node or at least one unique tuple of an interior node is capable of being associated with a count of the number of times that value or tuple of values occurred in the parallel data element sequences.

20. The method of claim 2, wherein at least one unique value of a leaf node or at least one unique tuple of an interior node is capable of being associated with a count of the number of times that value or tuple of values occurred in the parallel data element sequences.

21. The method of claim 3, wherein at least one unique value of a leaf node or at least one unique tuple of an interior node is capable of being associated with a count of the number of times that value or tuple of values occurred in the parallel data element sequences.

22. A method for constructing a hierarchical data-storage structure to improve compression for storing a plurality of parallel data element sequences on a computer memory component and retrieval of at least one element on a computer processor comprising:

(a) creating a plurality of dictionaries on the computer memory component, each of unique values for one of said data element sequences, wherein said dictionaries associate numeric indexes with unique values, (b) forming one or more n-ary trees on the computer memory component with leaf and interior nodes wherein:

(1) a plurality of leaf nodes on the computer memory component each correspond to one of said dictionaries,
    (2) at least one interior node on the computer memory component associates a numeric index with tuples of numeric indexes from other subordinate leaf or interior nodes,
    (3) one or more interior nodes store one or more sequences of mutually-consecutive tuples by representing said sequences in a form that uses less storage space than representing said sequences as individual tuples, and each of said interior nodes performs at least one of:
      i. records the addition of a tuple that extends a tuple sequence by modifiying one or more fields in the representation of said sequence that are capable of representing the length of said sequence, or
      ii. records the addition of a tuple that invalidates an existing tuple sequence by splitting said tuple sequence into one or more subsequences, wherein none of the tuples of said subsequences contain any element of said added tuple, or
      iii. records the addition of a tuple that has not been previously added to said interior node, wherein said added tuple does not extend a tuple sequence, by adding said tuple to a tuple collection, and (c) retrieving on the computer processor at least one element from one of said trees' leaf nodes on the computer memory component.

23. The method of claim 22, wherein at least one of said leaf nodes on the computer memory component:

(a) is distinct from, and represents a subset of values from one of said dictionaries, and
  (b) shares its dictionary with at least one other leaf node which also represents its subset of said dictionary's values.

24. The method of claim 22, wherein at least one of said interior nodes on the computer memory component has a gate field associated with it, which is capable of representing a subset of said interior node's subtrees.

25. The method of claim 22, wherein at least one unique value of a leaf node or at least one unique tuple of an interior node is capable of being associated with a count of the number of times that value or tuple of values occurred in the parallel data element sequences.

\* \* \* \* \*

UNITED STATES PATENT AND TRADEMARK OFFICE
CERTIFICATE OF CORRECTION

PATENT NO. : 8,396,844 B1
APPLICATION NO. : 11/523946
DATED : March 12, 2013
INVENTOR(S) : Balkany It is certified that error appears in the above-identified patent and that said Letters Patent is hereby corrected as shown below:

Title Page, Item (54) and in the specification, Column 1, line 1, delete "HIERARCHIAL METHOD FOR STORING DATA WITH IMPROVED COMPRESSION" and insert -- HIERARCHIAL METHOD FOR STORING AND RETRIEVING DATA WITH IMPROVED COMPRESSION --

Signed and Sealed this
Eleventh Day of June, 2013

Teresa Stanek Rea
*Acting Director of the United States Patent and Trademark Office*